March 12, 1935. E. F. PULS 1,993,856
MEANS FOR CONTROLLING VARIABLE SPEED GEARING
Filed March 7, 1934 2 Sheets—Sheet 1

March 12, 1935.  E. F. PULS  1,993,856
MEANS FOR CONTROLLING VARIABLE SPEED GEARING
Filed March 7, 1934   2 Sheets-Sheet 2
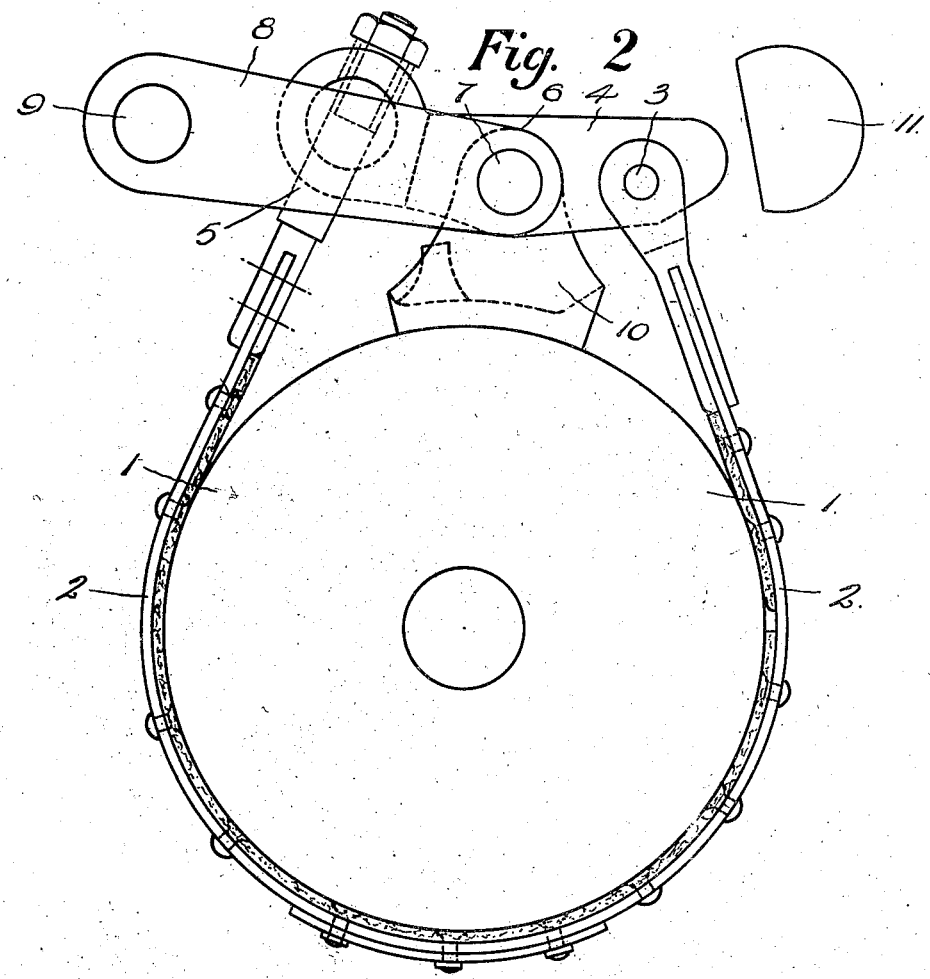
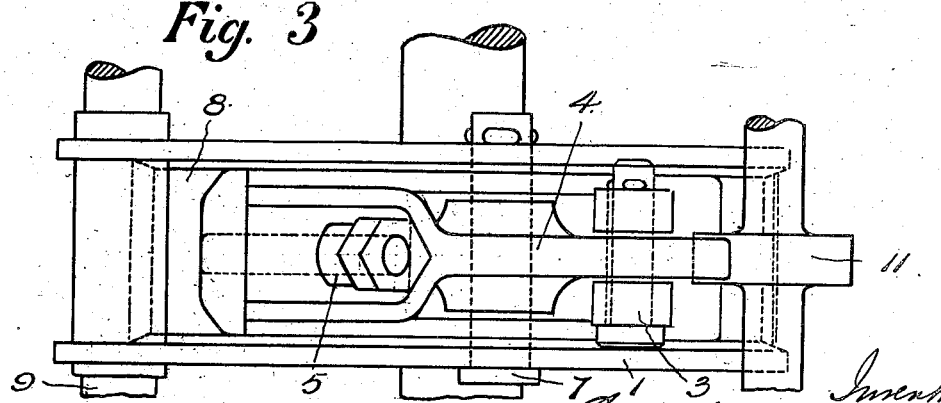

Patented Mar. 12, 1935

1,993,856

UNITED STATES PATENT OFFICE 1,993,856

MEANS FOR CONTROLLING VARIABLE SPEED GEARING

Erich Friedrich Puls, King's Norton, Birmingham, England

Application March 7, 1934, Serial No. 714,522
In Great Britain March 3, 1933

2 Claims. (Cl. 188—77)

This invention relates to improvements in means for controlling variable speed gearing and refers particularly to epicyclic gearing of the type in which gears are engaged by brake bands acting upon drums, the gear to be engaged being preselected automatically or by hand.

Examples of such gearing are described in the specification of U. S. Patent No. 1,647,580. In the gear controlling mechanism described in that patent specification the ends of a brake band for engaging a drum are connected to points adjacent opposite ends of a lever which is free to rock and to slide relatively to a fulcrum bar with which a notch or gap in one edge of the lever engages, the movement of the lever and hence the engagement or disengagement of the brake band being controlled by a cam against which one end of the lever abuts.

In this construction as the lever is free both to rock and to slide relative to the fulcrum bar the whole of the thrust when the brake is applied as well as the torque of the drive has to be taken by the gear-box or casing in which the fulcrum bar and camshaft are mounted, and the object of my invention is to provide an improved construction in which the load is balanced and the gear box or casing only has to take the torque. Stresses are thus reduced and a more positive action of the mechanism is obtained.

According to my invention the ends of a brake band for engaging a drum in an epicyclic gear train are connected to a lever pivotally mounted on a floating fulcrum or pivot which also carries a brake shoe adapted to engage a portion of the surface of the drum between the ends of the band, the lever being free only to rock about the floating fulcrum or pivot or alternatively being free both to rock and to slide to a limited extent about the fulcrum or pivot. The floating fulcrum or pivot is conveniently formed by a pivot pin on the free end of a link of which the other end is pivotally mounted on a fixed pivot carried by the gear box or casing.

Thus when the brake-band is in engagement with the drum the load or thrust on the ends of the band is balanced by the engagement of the brake shoe against the surface of the drum acting in opposition to the tension in the band so that the fulcrum is relieved of any load other than the torque which is transmitted to the gear box or casing through the link.

The points on the lever to which the ends of the band are connected are at different distances from the pivot of the lever so that a rocking movement or a combined rocking and sliding movement of the lever causes the engagement or disengagement of the brake-band with the drum and the movement of the lever is controlled by a cam engaging a surface at one end of the lever, the cam being rotated by the operator or being rotated automatically when a movement of the lever caused by a reversal of the torque between the drum and the brake-band permits such rotation.

The arrangement of the brake shoe between the ends of the brake-band may involve a slight reduction in the effective length of the band in engagement with the surface of the drum but this is compensated for by the length of the surface of the brake shoe in engagement with the drum. The surface of the shoe which engages with the drum is preferably not of friction material but of bronze or other suitable metal so that the engagement of the shoe with the drum is more in the nature of a bearing than a brake and the shoe will clear the drum without drag when the band is released.

One practical form of my invention is illustrated by way of example in the accompanying drawings in which:—

Figure 2 is a similar view showing the brake band tightened on to the drum.

Figure 3 is a plan of Figure 1.

Figure 1:
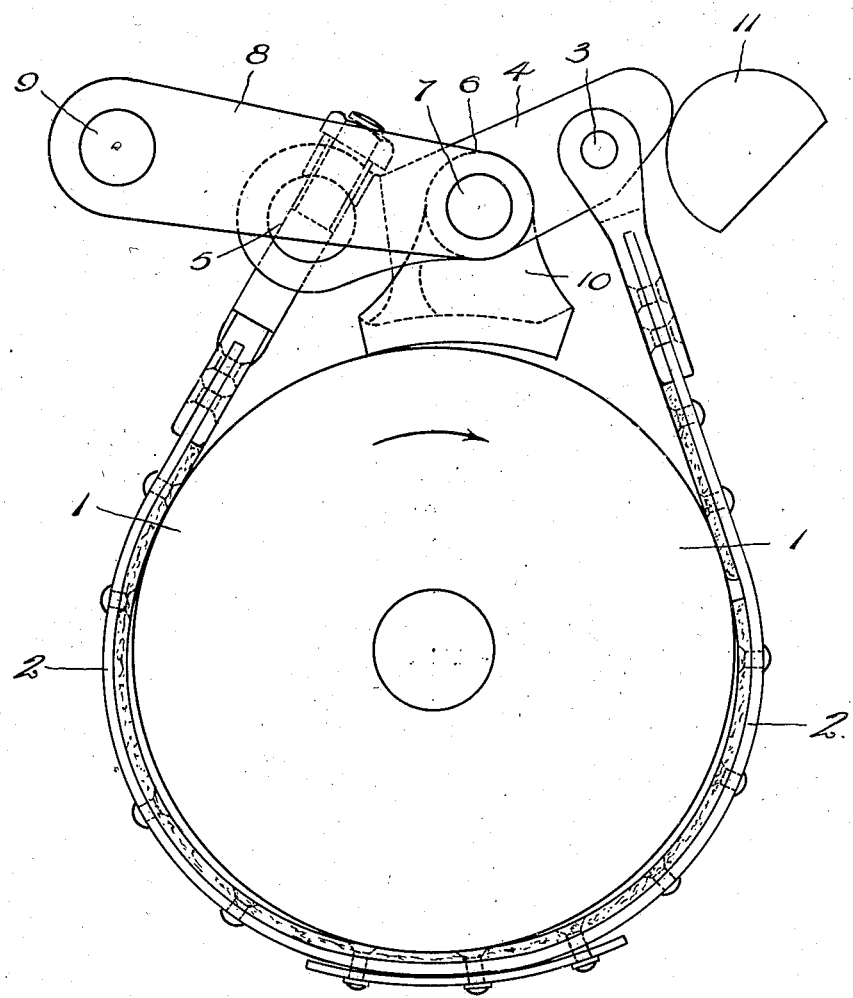
Figure 1 is an end elevation of a drum forming part of epicyclic change-speed gearing fitted with my improved control, the brake band being shown in the free position.

In these drawings 1 is a rotatable drum and 2 is a brake band encircling the greater part of the periphery of the drum which normally tends to rotate in the direction shown by the arrow in Figure 1. One end of the brake band is pivotally connected at 3 to one end of a lever 4 and the other end of the band is pivotally and adjustably connected at 5 to the other end of the lever.

At an intermediate point 6 the lever is pivotally mounted on a pin 7 carried at the free end of a link 8 of which the other end is pivoted on a fixed pivot or bar 9 carried by the gear-box casing. There is also pivoted on the pin 7 a brake-shoe 10 or thrust member having an arcuate surface adapted to engage with the surface of the drum between the ends of the brake band. The point 3 at which the one end of the brake band is connected to the lever 4 is at a shorter distance from the axis of the pin 7 than the point 5 at which the other end of the band is connected to the lever, so that clockwise movement of the lever causes the engagement of the brake band with the drum and an anti-clockwise movement disengages the band from the drum. The normal rotation of the drum tends to rock the lever in a clockwise direction and to tighten the band, but the movement of the lever in this direction is controlled by a rotatable cam 11 engaging a surface at the end of the lever.

When the brake-band is disengaged the parts are normally in the position shown in Figure 1, clockwise movement of the lever being prevented by the cam 11. In this position of the parts the drum is free to rotate and its rotation rocks over the brake shoe 10 which only touches the drum lightly at one edge.

When the driving torque on the drum is relieved the pressure of the lever 4 on the cam 11 is released and the cam can then be rotated until it clears the lever. The drag on the brake band then rocks over the lever 4 in a clockwise direction and the band is tightened around the drum to hold the drum against rotation as shown in Figure 2.

As this occurs the brake shoe is rocked back and drawn radially inwards against the surface of the drum, and the brake-shoe then balances the load or thrust on the ends of the brake-band, the pressure of the brake-shoe acting in opposition to the tension in the band so that the pivot pin 7 is relieved of any load other than the torque which is taken by the gear-box casing through the link 8.

I claim:

1. Means for controlling the rotation of a drum forming part of epicyclic change-speed gearing comprising a brake-band encircling the greater part of the periphery of the drum, a link pivoted at one end on a fixed pivot, a lever pivoted on the free end of said link and connected at its ends to the ends of the brake band, and a brake shoe carried by the free end of said link and adapted to engage a portion of the surface of the drum between the ends of the brake band.

2. Means for controlling the rotation of a drum forming part of epicyclic change-speed gearing comprising a brake-band encircling the greater part of the periphery of the drum, a shiftable lever to which the ends of the band are connected, a movable stop for said lever to hold the lever against movement and prevent the band from gripping the drum and to allow the lever to move and cause the band to tighten on to the drum, a floating fulcrum for said lever, and a brake shoe carried by said fulcrum and adapted to bear against the surface of the drum when the band is tightened on to the drum, the engagement of said shoe with the drum balancing the load on the ends of the band and relieving the fulcrum of this load.

ERICH FRIEDRICH PULS.